Jan. 21, 1958     H. J. AROYAN     2,820,819
SEPARATION OF ISOMERIC PHTHALIC ACIDS
Filed Dec. 30, 1952
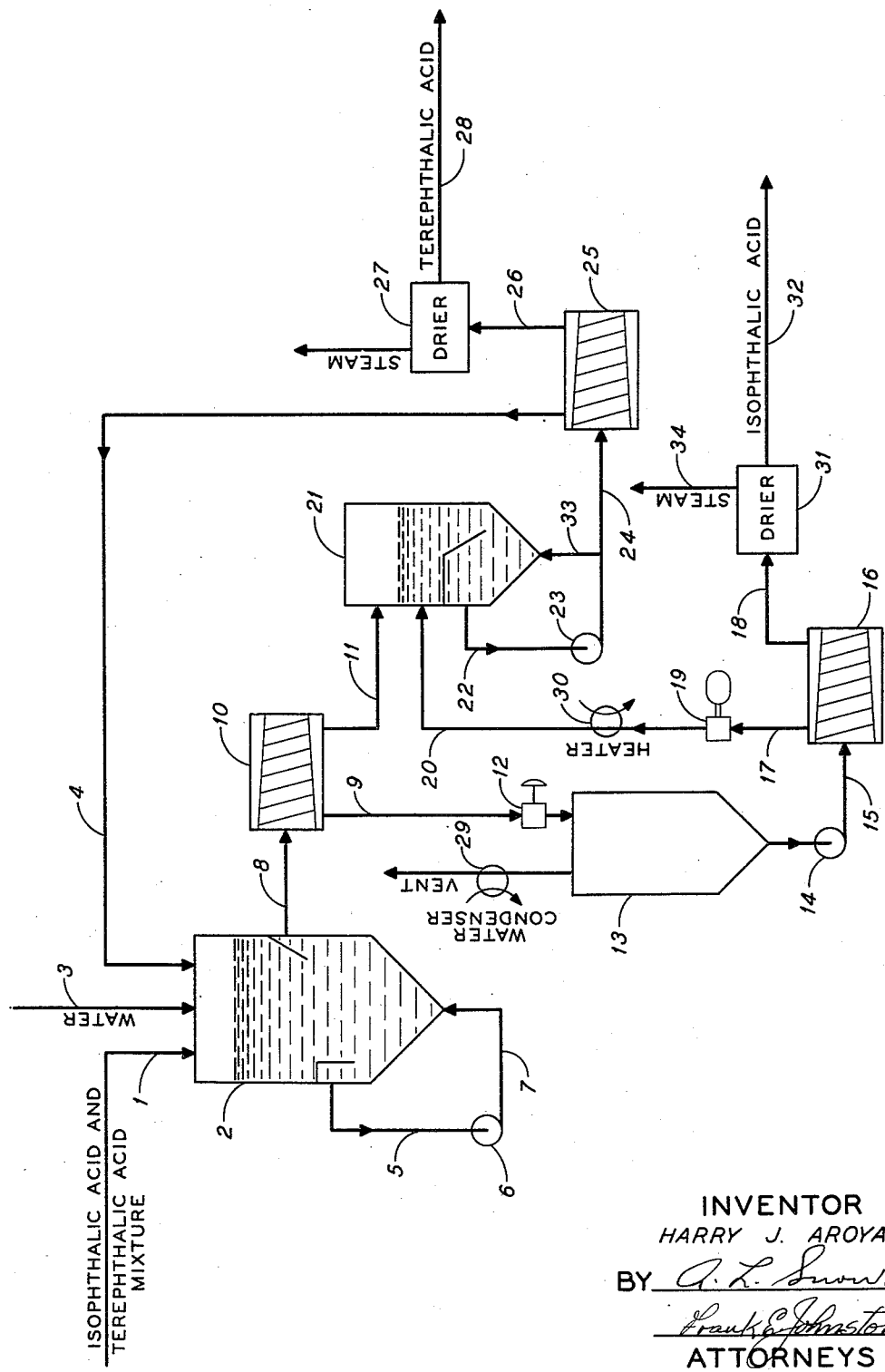
INVENTOR
HARRY J. AROYAN
ATTORNEYS United States Patent Office 2,820,819
Patented Jan. 21, 1958

2,820,819

SEPARATION OF ISOMERIC PHTHALIC ACIDS

Harry J. Aroyan, El Cerrito, Calif., assignor to California Research Corporation, San Francisco, Calif., a corporation of Delaware Application December 30, 1952, Serial No. 328,693

3 Claims. (Cl. 260—525)

This invention relates to a process for separating mixtures of isphthalic acid and terephthalic acid.

Isophthalic acid and terephthalic acid are produced by oxidizing the corresponding xylene isomers. The xylene isomers themselves are difficult to separate at high purity. On a commercial scale the xylene isomers are separated by fractional crystallization and ordinarily the maximum feasible para-xylene content of the para-xylene fraction is about 95% by volume. Meta-xylene has not been produced commercially at so high a purity. In the commercial utilization of isophthalic acid and terephthalic acid, extremely high purities of the individual isomers are required. Accordingly, the mixed phthalic acids obtained by oxidizing the purest available commercial xylene streams require further purification. Further, a highly efficient process for separating mixtures of isophthalic acid and terephthalic acid would eliminate the need for separating the xylene isomers prior to oxidation.

It has now been found that mixtures of isophthalic acid and terephthalic acid can be efficiently separated by intimately mixing the acids with liquid water at temperatures in the range 350 to 500° F. The quantity of water added to the mixture of acids is insufficient to dissolve all of the acid mixture at the temperature employed. In the contact of the water and mixed acids under these conditions a slurry is formed consisting of a concentrated solution of isophthalic acid and a solid phase which is predominantly terephthalic acid. The slurry is filtered at 350 to 500° F. to obtain a filter cake which has a substantially higher terephthalic acid content than the initial mixture and a filtrate containing in solution a mixture of isophthalic acid and terephthalic acid having a much higher isophthalic acid content than the initial mixture of acids.

As indicated above, the temperature at which water and the iso- and terephthalic acid mixture is contacted must lie in the range 350 to 500° F., preferably in the range 400 to 490° F. At temperatures below 350° F. neither of the acids is appreciably soluble in water, the saturated solutions containing less than 1% acid by weight. At 450° F. a saturated solution of isophthalic acid contains about 15% by weight of isophthalic acid and a saturated solution of terephthalic acid contains only a fraction of 1% by weight terephthalic acid. At temperatures above 500° F. separation of the acids can be made, but at such temperatures the solubility of terephthalic acid increases at a greater rate than does the solubility of isophthalic acid so that the partition is not as favorable. Further, filtration of the slurries becomes more difficult as the temperature is increased. The acid mixtures which can be separated pursuant to the invention vary widely in composition, but must contain above approximately 2% by weight of terephthalic acid if the two fractions obtained during the separation treatment are to differ markedly in composition from the original mixture. Ordinarily, the mixtures subjected to treatment will contain above 5% terephthalic acid and may contain in excess of 95% terephthalic acid.

The quantity of water added to the acid mixture must be sufficient to form a reasonably fluid slurry which can be readily agitated and pumped from one piece of apparatus to another during the treatment. In acid mixtures containing 50% or more of isophthalic acid, water can be added in amounts as small as 0.3 to 0.4 pound of water per pound of isophthalic acid contained in the mixture. When the acid mixture contains relatively small amounts of isophthalic acid, larger amounts of water relative to the isophthalic acid content of the mixture must be added in order to produce slurries which can be readily handled. With acid mixtures containing only 1 to 10% of isophthalic acid, it is desirable to contact each pound of the acid mixture with at least one pound of water.

The process of the invention is illustrated by the following examples. Unless otherwise specified the parts given are on a weight basis.

One part of a mixture of isophthalic acid and terephthalic acid containing 70% by weight of isophthalic acid was heated with .4 part of water to 475° F. in a closed vessel and shaken for about 5 minutes. The contents of the vessel were filtered at 475° F. and the first filtrate contained 70% by weight of isophthalic acid and less than 2% by weight of terephthalic acid. The filter cake was washed with 1 part of water at 475° F. After washing, the filter cake was cooled and on analysis was found to be substantially pure terephthalic acid. The filtrates were combined, cooled to room temperature, and filtered. The filter cake was a mixture of isophthalic acid and terephthalic acid containing less than 5% by weight of terephthalic acid.

The appended drawing is a diagrammatic illustration of apparatus and process flow conditions suitable for the practice of the invention. A mixture of 53 parts of isophthalic acid and 58 parts of terephthalic acid is introduced through line 1 into contacting vessel 2 which is maintained at 450° F. and approximately 425 p. s. i. 100 parts of fresh water are added through line 3 into vessel 2. In addition, a recycle stream containing about 300 parts water, 7 parts isophthalic acid, and 2 parts terephthalic acid is added to vessel 2 via line 4. Slurry is withdrawn from contactor 2 through line 5 and is forced by pump 6 through line 7 into the bottom of contactor 2 to agitate the solid-liquid mixture in contactor 2. After an average residence time of 45 minutes, slurry containing about 60 parts isophthalic acid, 60 parts terephthalic acid and 400 parts water is withdrawn from contactor 2 through line 8 and passed into centrifugal filter 10, which is operated at 450° F. and approximately 425 p. s. i. Wet terephthalic acid cake and accompanying mother liquor is withdrawn from centrifugal filter 10 through line 11. The cake and mother liquor together containing about 50 parts water, 58 parts terephthalic acid and 8 parts isophthalic acid are passed into slurry contactor 21 where the terephthalic acid filter cake and mother liquor are reslurried for about 45 minutes at 450° F. and approximately 425 p. s. i. with an additional 300 parts of recycle water from line 20. Slurry is withdrawn from reslurry contactor 21 through line 22 and pump 23. A portion of the slurry is returned via line 33 into the bottom of reslurry contactor 21 to provide agitation and proper contact of solid terephthalic acid with the water. The remainder of the slurry containing about 8 parts isophthalic acid, 58 parts of terephthalic acid and 350 parts water is withdrawn through line 24 and is filtered at 450° F. and approximately 425 p. s. i. in centrifugal filter 25. Wet terephthalic acid cake containing about 1 part isophthalic acid, 56 parts terephthalic acid and 50 parts water is withdrawn from centrifugal filter 25 through line 26 into a drier 27, from which about 50 parts of water are withdrawn as steam and from which about 56 parts of dry, purified terephthalic acid crystals and about 1 part isophthalic acid crystals are obtained via line 28. The filtrate produced at centrifugal filter 25 is used as a recycle water stream and is passed through line 4 into slurry contactor 2. The filtrate from centrifugal filter 10 containing about 350 parts water, 52 parts isophthalic acid and 2 parts terephthalic acid is passed through line 9 to pressure let-down valve 12 where the solution is flash depressurized from 450° F. and 425 p. s. i. to 212° F. and 1 atmosphere pressure. Flash chamber 13 is equipped with an overhead water condenser-cooler 29 to knock back as water the steam formed during the flashing operation. From flash chamber 13, the slurry is fed by pump 14 through line 15 into centrifugal filter 16 operating at 1 atmosphere pressure and approximately 180° F. The filtrate from atmospheric centrifugal filter 16 is passed through line 17 to pump 19 where it is pressurized to 45° p. s. i. From pump 19, the filtrate travels to heater 30 where the temperature is raised to 450° F. and then passes through line 20 to reslurry contactor 21. The wet isophthalic acid cake from centrifugal filter 16 containing about 52 parts isophthalic acid, 2 parts terephthalic acid and 50 parts water is passed through line 18 to drier 31 where about 50 parts of water are removed as steam via line 34. From drier 31, about 52 parts dry, purified isophthalic acid crystals and about 2 parts terephthalic acid crystals are obtained through line 32.

I claim:

1. A process for separating a mixture of isophthalic acid and terephthalic acid containing from 2 to 95% by weight of terephthalic acid, which comprises intimately contacting the mixture with water at an elevated temperature in the range 350° to 500° F., under an elevated pressure sufficient to maintain the water in liquid phase at said elevated temperature to form a slurry, and separating a solid phase and a liquid phase from the slurry while maintaining said elevated temperature and pressure.

2. A process for separating mixtures of isophthalic acid and terephthalic acid containing from 3% to 95% by weight of terephthalic acid, which comprises intimately contacting the mixture with liquid water at an elevated temperature in the range 400° F. to 490° F., and under a superatmospheric pressure sufficient to maintain water in liquid phase, the quantity of water being from 0.5 to 20 times the weight of isophthalic acid in the mixture and separating a solid phase and a liquid phase from the resultant mixture while maintaining said elevated temperature and said superatmospheric pressure.

3. A process for separating mixtures of isophthalic acid and terephthalic acid containing from 5% to 95% by weight of terephthalic acid, which comprises intimately contacting the mixture with liquid water at a temperature of approximately 450° F. and a pressure of approximately 425 pounds per square inch, the quantity of water being from 0.5 to 20 times the weight of isophthalic acid in the mixture and separating as a solid phase a mixture predominantly terephthalic acid and as a liquid phase a concentrated solution of isophthalic acid, said separation being made while maintaining the temperature above 350° F. and while maintaining a superatmospheric pressure sufficient to maintain the water in liquid phase.

References Cited in the file of this patent

UNITED STATES PATENTS 2,572,575    Shafer et al. _____ Oct. 23, 1951
2,697,723    Carlston et al. _____ Dec. 21, 1954

OTHER REFERENCES

Fittig et al.: Liebig's Ann., vol. 148, pgs. 11–23 (1868).
Meyer: Liebig's Ann., vol. 156, page 276 (1870).
Richter: Ber. Duet. Chem., vol. 6, pgs. 877–8 (1873).
Ullman: Ber. Deut. Chem., vol. 36, page 1798 (1903).
Heilbron: Dict. of Org. Compd's (Oxford), vol. II, page 446 (1936).